(12) United States Patent
Chuang et al.

(10) Patent No.: US 8,452,116 B1
(45) Date of Patent: May 28, 2013

(54) ESTIMATING SENSOR SENSITIVITY

(75) Inventors: Jason C. Chuang, Stanford, CA (US);
Holger Winnemoeller, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 1013 days.

(21) Appl. No.: 12/274,233

(22) Filed: Nov. 19, 2008

Related U.S. Application Data (60) Provisional application No. 61/098,542, filed on Sep. 19, 2008.

(51) Int. Cl.
*G06K 9/40* (2006.01)

(52) U.S. Cl.
USPC ......................................................... 382/260

(58) Field of Classification Search
USPC .......... 382/162–167, 190, 254, 260; 348/272, 348/180–191, 273, 229.1, 230.1, 250.8; 250/208.1, 226; 358/504
See application file for complete search history.

(56) References Cited

U.S. PATENT DOCUMENTS

| | | | |
|---|---|---|---|
| 6,441,923 B1 * | 8/2002 | Balasubramanian et al. | 358/3.23 |
| 6,768,509 B1 * | 7/2004 | Bradski et al. | 348/207.99 |
| 6,915,021 B2 * | 7/2005 | Cannata et al. | 382/254 |
| 7,557,826 B2 * | 7/2009 | Berestov et al. | 348/188 |
| 7,783,114 B2 * | 8/2010 | Bradski et al. | 382/224 |
| 2007/0047835 A1 * | 3/2007 | Kondo | 382/275 |
| 2008/0039702 A1 | 2/2008 | Hayter et al. | |

OTHER PUBLICATIONS

.Z. Hel-Or, B.A. Wandell, Object-based illumination classification, Pattern Recognition, vol. 35, Issue 8, Aug. 2002, pp. 1723-1732.*
Marc Ebner. 2007. Estimating the spectral sensitivity of a digital sensor using calibration targets. In Proceedings of the 9th annual conference on Genetic and evolutionary computation (GECCO '07). ACM, New York, NY, USA, 642-649.*
M.J. Vrhel, H.J. Trussell, "Color scanner calibration via a neural network," icassp, vol. 6, pp. 3465-3468, Acoustics, Speech, and Signal Processing, 1999. Proceedings. vol. 6, 1999 IEEE International Conference on, 1999.*
Bradley S. Carlson, "Evaluating Image Sensor Sensitivity by Measuring Camera Signal-to-Noise Ratio", Electro-Optical System Design, Simulation, Testing, and Training, Richard M. Wasserman, Scott L. DeVore, Editors, Proceedings of SPIE vol. 4772 (2002).*
Peters, R.A., II.;, "A new algorithm for image noise reduction using mathematical morphology," Image Processing, IEEE Transactions on , vol. 4, No. 5, pp. 554-568, May 1995.*
Marc Ebner, Estimating the Spectral Sensitivity of a Digital Sensor Using Calibration Targets, GECCO'07, Jul. 7-11, 2007, London, England, United Kingom, ACM 2007.
Liu, et al., Automatic Estimation and Removal of Noise from a Single Image, IEEE Transaction on Pattern Analysis and Machine Intelligence, vol. 30, No. 2, Feb. 2008, pp. 299-314.

* cited by examiner

*Primary Examiner* — Andrae S Allison
(74) *Attorney, Agent, or Firm* — Wolfe-SBMC (57) ABSTRACT

A method, system, and computer-readable storage medium for determining an estimate of sensor sensitivity associated with an image. A noise level of an image is determined, then an estimate of sensor sensitivity associated with the image is automatically determined, e.g., by a trained classifier based on the determined noise level. Additionally, the sensor sensitivity estimate can be used to determine scene brightness.

40 Claims, 7 Drawing Sheets

ESTIMATING SENSOR SENSITIVITY

This Application claims priority under 35 U.S.C. Section 119(e) to U.S. Provisional Application No. 61/098,542, filed Sep. 19, 2008, the disclosure of which is hereby incorporated by reference in its entirety.

BACKGROUND

1. Field of the Invention

The present invention is directed generally to digital image processing, and more particularly to estimating sensor sensitivity, e.g., from a single image. The application of the estimated sensor sensitivity to estimating scene brightness is also described.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and 16 bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Figure 1:
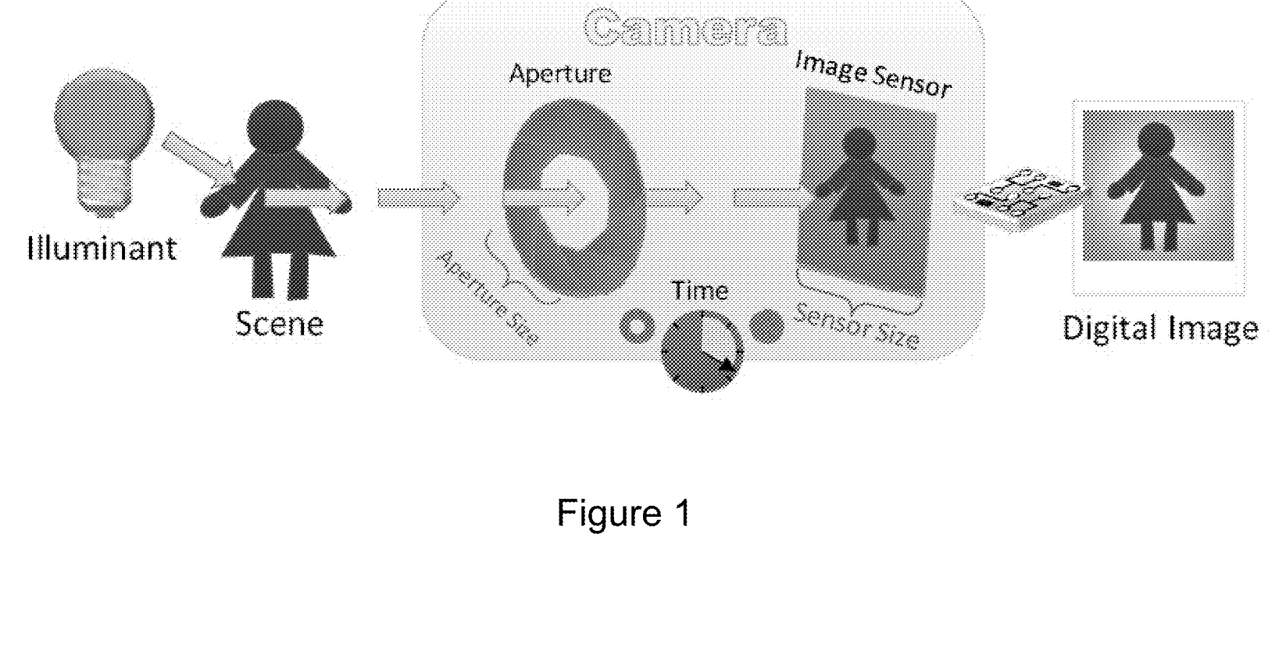
FIG. 1 illustrates a process of capturing a digital photograph.

FIG. 1 illustrates the general operation of a digital camera at a high level. One or more sources of illumination, i.e., an illuminant, emit light, which bounces of objects in a scene. Some of this light enters the lens of the camera, passing the camera's aperture. The aperture is open (with fixed aperture size) for a finite amount of time, as indicated in FIG. 1. During this time, the light passing through the aperture reaches the camera's image sensor, which has a specified sensor size, as shown, where it is integrated, and converted into a digital image, depending on the sensor's sensitivity setting (ISO 12232:2006 value, referred to herein as "ISO" or "ISO value" for convenience).

Scene brightness is the amount of light illuminating a given scene. Consideration of scene brightness may allow one to guess whether a picture was taken indoors vs. outdoors because the intensity of sunlight is several orders of magnitude greater than that of any artificial light. Knowing whether a picture was taken indoors vs. outdoors, in addition with other content dependent information, can help determine the more specific environment for the photograph.

Scene brightness can be directly measured at the time a picture is taken by placing a light meter on a subject. For most nonprofessional photographs, however, such measurement is not performed. However, scene brightness is commonly calculated a posteriori from a photograph, based on several camera parameters at the time of exposure. More specifically, current scene brightness (B) computation relies on four parameters: aperture (f), exposure time (t), sensor sensitivity (S), and pixel intensity in the image (I). While it is possible to reconstruct scene brightness a posteriori, a significant portion of real life photographs are missing the required sensor sensitivity information (S). Modern digital cameras store shooting parameters in the EXIF metadata fields of a digital photograph. The parameters aperture (f) and exposure time (t) are readily available for almost all images with EXIF data. Pixel intensity (I) is stored in the pixel data and is thus always available.

Unfortunately, the same is not true for the sensor sensitivity (S) parameter. Various camera manufactures record sensor sensitivity information (commonly referred to as the ISO value) in proprietary formats and in nonstandard EXIF fields, which can be corrupted or discarded by third party image editing or transfer software. For example, only a portion of photographs in typical photo databases or archives have ISO values recorded in their metadata. Current algorithms either cannot proceed with the calculation of scene brightness altogether, or insert a constant for the ISO value in their equations, which may lead to low quality brightness estimates and may not be sufficient for many applications.

SUMMARY

Various embodiments of systems, methods, and computer-readable storage media for estimating sensor sensitivity from a single image are presented.

A noise signature of an image may be determined. In other words, the image (i.e., image data) may be analyzed to determine the degree of noise in the image, and a signature or metric characterizing the degree of noise determined for the image. In one embodiment, the image may be de-noised, thereby generating a de-noised image. In other words, a digital signal recorded from a camera's image sensor is assumed to be corrupted by noise, thus deviating from a hypothetical ideal (noiseless) image. To approximate this ideal image, small deviations in the input signal may be removed or eliminated via an appropriate filter. However, it should be noted that this is but one exemplary way to produce the de-noised image. More generally, the idea of de-noising the image is to produce an ideal (or an approximation of an) image free of noise, i.e., a substantially noise-free image, which may be accomplished via any of a variety of ways, e.g., via a generative model. In other words, the de-noised image may be produced independently of the original image. Note, however, that for simplicity and clarity, the term "de-noised image" is used herein to refer to such a substantially noise-free image, regardless of the manner in which it was obtained or generated.

In one embodiment, both the original image and the de-noised image may be decomposed into respective and corresponding pluralities of patches. In other words, each image may be decomposed into a respective plurality of pixel patches, where each patch from the original image has a corresponding patch from the de-noised image, thus forming corresponding pairs of patches. In one embodiment, patches of various sizes may be generated, e.g., square patches of sizes 4×4, 8×8, and 16×16 pixels, and so each image may be partitioned or decomposed multiple times—once per patch size. Said another way, decomposing each of the image and the de-noised image into respective and corresponding pluralities of patches may include partitioning each image multiple times with respective different patch sizes. Computing patches at several different rectangle sizes enables the method to obtain cumulative information at multiple resolutions. In some embodiments, neighboring patches may overlap, e.g., by half the patch width, and so each portion of the image may be represented in more than one patch of a given size, and may also be represented in multiple patches of different size. Note that the spatial arrangement of patches is irrelevant to the present method, and so all patches (of all sizes) may be treated as a single long list of patches. Note further that generally, decomposing the image(s) may a produce a large number of patches, e.g., on the order of 800,000 patches for typical digital images of 2-5 Megapixels, although with smaller or larger images, and different sized patches, different numbers of patches may be produced.

A descriptor may be determined for each patch in the image based on the patch of the image and the corresponding patch of the de-noised image, where the descriptor characterizes noise in the patch of the image by summarizing the patch's pixel intensity and pixel alteration due to de-noising. In one embodiment, a descriptor (for each patch) may be determined for each of a plurality of image attributes. For example, in some embodiments, a separate descriptor may be determined per color channel of the image, e.g., for each of R (Red), G (Green), and B (Blue) color channels of the image, although it should be noted that other color models may be used as desired, e.g., CMYK (Cyan, Magenta, Yellow, Black), HSV (Hue, Saturation, and Value), and/or HSL (Hue, Saturation, and Lightness (or Luminance)), among others.

Moreover, in some embodiments, texture may also be included as a characterizing feature of the images, e.g., of the image patches. As used herein, "texture" refers to random, stochastic, or uncorrelated high-frequency variations in an image, e.g., exemplified by images of snow, sand, grass, forests, etc. Note that sometimes such textures may be confused with noise, and so including texture information in the characterization of a patch may improve the quality of the patch descriptors.

Thus, a plurality of patch descriptors may be determined that characterize differences between corresponding patches of the original image and the de-noised image, and thus that characterize noise in the patches of the (original) image. The patch descriptors may be a descriptor of the noise in that patch which includes, but is not limited to, the average difference of pixels in the noisy and de-noised image. Additional entries in such a descriptor (e.g., vector) may include a texture descriptor that characterizes or classifies texture of the patch, amongst other metrics.

Then, a noise signature for the image may be created based on the plurality of patch descriptors. There are numerous ways the noise signature may be built. For example, in one embodiment, a subset of the patches, or more accurately, patch descriptors, may be selected and used to build a noise signature for the image.

The patches (or patch descriptors) may then be divided or sorted by their intensity, color channel, and/or texture. Each patch descriptor may be assigned to a bin with corresponding intensity level, color channel, and/or texture. Within each bin, the patches may be sorted by the amount of pixel alteration, and the descriptors with the lowest noise values selected. For example, in one embodiment, multiple groups of various sizes of the lowest noise descriptors may be selected to avoid being influenced unduly by misleading statistical deviations in the image data. For example, in one exemplary embodiment, the 25, 40, and 80 lowest noise valued descriptors may be selected, although in other embodiments, other numbers of groups (including one) and thresholds may be used as desired. The noise signature may be defined (and created) as the weighted average pixel alteration of these 25, 40, and 80 patches, weighted so that patches with less noise are given greater weight. Any of a number of different approaches may be taken in weighting the patches (or descriptors), the point being to capture the minimum pixel alteration in each of the bins.

Thus, in some embodiments, the noise signature may comprise a set of discrete noise values or descriptors correlated to one or more image attributes or parameters, e.g., intensity level, color channel, and/or texture, and thus may be or include a (possibly multi-dimensional) noise profile with respect to these parameters.

An estimate of sensor sensitivity associated with the image may be automatically determined based on the determined noise signature. For example, the noise signature may be provided as in input to a trained classifier, e.g., a support vector machine, neural network, etc., which may then operate to estimate the sensor sensitivity. In other words, a trained classifier may take the noise signature as input, e.g., as input features, and may generate a corresponding sensor sensitivity value, where the sensor sensitivity value is a "prediction" or estimate of the sensor sensitivity of the camera that produced the image. In one embodiment, the sensor sensitivity value may take the form of an ISO sensitivity value, e.g., in accordance with ISO 12232:2006, although any other representation of sensor sensitivity may be used as desired. The classifier may be implemented in any of various ways, e.g., as a support vector machine (SVM), a neural network, etc., as desired. The predicted or estimated sensor sensitivity value may be stored, e.g. in a memory medium, and/or output to a display device or an external device, e.g. over a network. The sensor sensitivity estimate may be used to perform further analysis of the image.

In one embodiment, a classifier may be built for each camera model (and possibly camera make) using a collection of photographs (e.g., random photographs taken with the same camera and retrieved from a photographic archive). In other words, the classifier may include a plurality of classifiers, each directed to a respective camera model or make. When the sensitivity (e.g., ISO) value of an image is missing, the classifier may then predict the image's sensitivity (e.g., ISO) value based on its noise signature, as described above.

In some embodiments, an estimate of scene brightness for the image may be automatically determined based on the estimate of sensor sensitivity and metadata of the image, where the metadata includes aperture information, exposure time information, and intensity information (for the image). The estimate for scene brightness may then be stored in a memory medium, or output to an external device, e.g., a monitor, printer, or other computer system, e.g., over a network. The estimate of scene brightness for the image may be used, e.g., in conjunction with other aspects of the image, in any of numerous applications, one example of which is to categorize or classify the image (or scene), e.g., for subsequent use by search engines, e.g., for search and retrieval of images based on semantic content of the image(s), among other applications. For example, images may be categorized according to scenario, e.g., beach, mountain, sea, mall, etc., where a particular image may be identified as representing a particular category.

Thus, various embodiments of the above methods may be used to estimate sensor sensitivity associated with an image, e.g., to generate an estimate of sensor sensitivity (e.g., ISO value) of the camera that produced the image.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Embodiments of the systems and methods described herein may be used to estimate light sensor sensitivity from a single image. Examples of applications for such an estimation of sensor sensitivity include, but are not limited to, image classification and camera classification, as well as scene or image decomposition and analysis, e.g., for scientific or security applications, e.g., monitoring, surveillance, etc.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and is generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Figure 2:
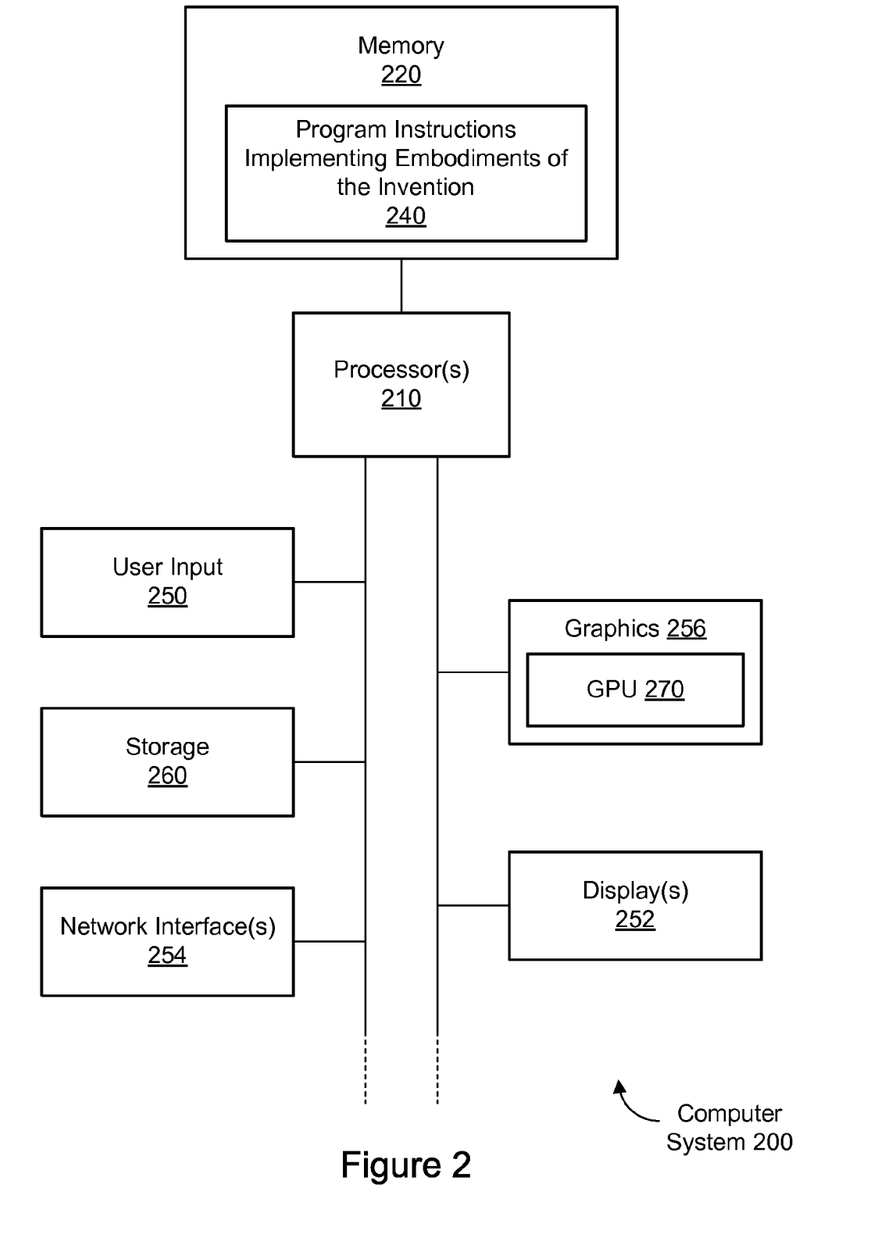
FIG. 2 is a block diagram of an exemplary system configured to implement embodiments of the present invention.

FIG. 2 is a block diagram illustrating constituent elements of a computer system 200 that is configured to implement embodiments of the systems and methods described herein.

The computer system 200 may include one or more processors 210 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 200, such as various versions of Unix, Linux, Windows® from Microsoft Corporation, MacOS® from Apple Inc., or any other operating system that enables the operation of software on a hardware platform. The processor(s) 210 may be coupled to one or more of the other illustrated components, such as a memory 220, by at least one communications bus.

In one embodiment, a specialized graphics card or other graphics component 256 may be coupled to the processor(s) 210. The graphics component 256 may include a graphics processing unit (GPU) 270, which in some embodiments may be used to perform at least a portion of the techniques described below. Additionally, the computer system 200 may include one or more imaging devices 252. The one or more imaging devices 252 may include various types of raster-based imaging devices such as monitors and printers. In one embodiment, one or more display devices 252 may be coupled to the graphics component 256 for display of data provided by the graphics component 256.

In one embodiment, program instructions 240 that may be executable by the processor(s) 210 to implement aspects of the techniques described herein may be partly or fully resident within the memory 220 at the computer system 200 at any point in time. The memory 220 may be implemented using any appropriate medium such as any of various types of ROM or RAM (e.g., DRAM, SDRAM, RDRAM, SRAM, etc.), or combinations thereof. The program instructions may also be stored on a storage device 260 accessible from the processor(s) 210. Any of a variety of storage devices 260 may be used to store the program instructions 240 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 260 may be coupled to the processor(s) 210 through one or more storage or I/O interfaces. In some embodiments, the program instructions 240 may be provided to the computer system 200 via any suitable computer-readable storage medium including the memory 220 and storage devices 260 described above.

The computer system 200 may also include one or more additional I/O interfaces, such as interfaces for one or more user input devices 250. In addition, the computer system 200 may include one or more network interfaces 254 providing access to a network. It should be noted that one or more components of the computer system 200 may be located remotely and accessed via the network. The program instructions may be implemented in various embodiments using any desired programming language, scripting language, or combination of programming languages and/or scripting languages, e.g., C, C++, C#, Java™, Perl, etc. The computer system 200 may also include numerous elements not shown in FIG. 2, as illustrated by the ellipsis.

Figure 3:
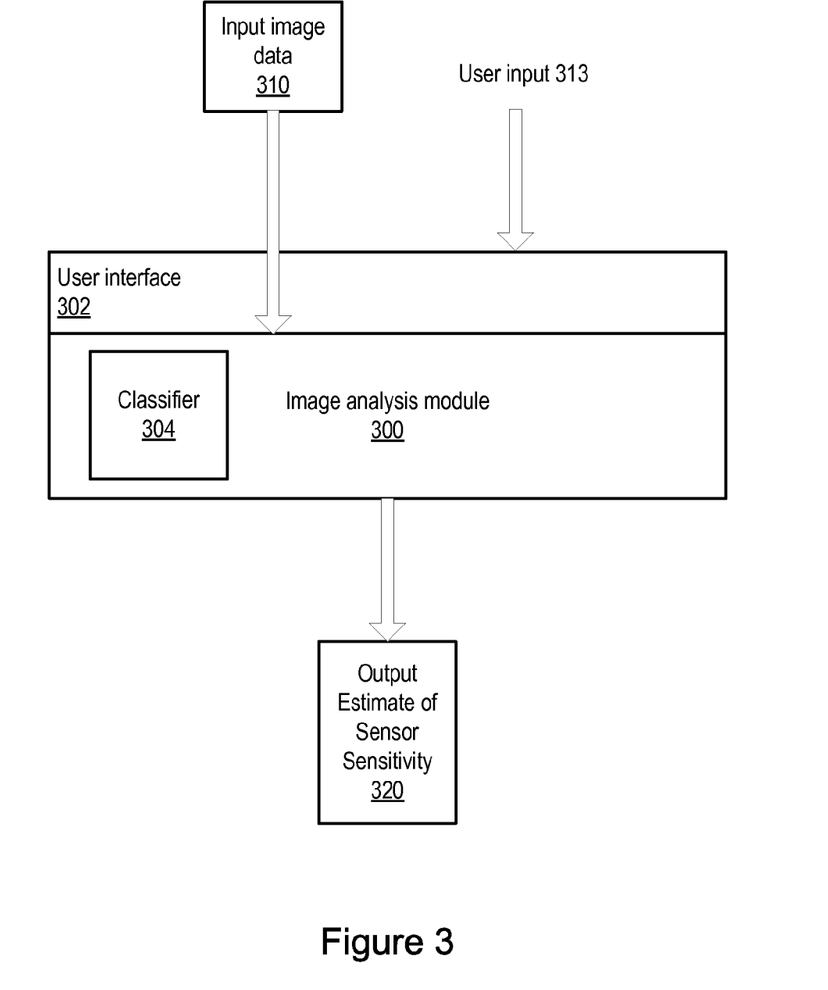
FIG. 3 illustrates an exemplary image analysis module, according to one embodiment.

FIG. 3 illustrates an exemplary image analysis module that may implement embodiments of a method for estimating sensor sensitivity from a single image, as described below with reference to FIG. 4. In one embodiment, module 300 may provide a user interface 302 that includes one or more user interface elements via which a user may initiate, interact with, direct, and/or control the method performed by module 300. Module 300 may be operable to obtain digital image data for a digital image 310, receive user input 312 specifying attributes of the process, and determine and output an estimate of sensor sensitivity for the image data 320, e.g., using a classifier 304. In various embodiments, the classifier may or may not be included in the module itself. Moreover, in some embodiments, the module 300 may be operable to determine an estimate of scene brightness for the image based on the estimated sensor sensitivity and other parameters such as aperture (f), exposure time (t), and pixel intensity (I), as will be discussed in more detail below.

Image analysis module 300 may be implemented as or in a stand-alone application or as a module of or plug-in for an image analysis and/or processing application. Examples of types of applications in which embodiments of module 300 may be implemented may include, but are not limited to, image analysis and editing, processing, and/or presentation applications, as well as applications in security or defense, educational, scientific, medical, publishing, digital photography, digital films, games, animation, marketing, and/or other applications in which digital image analysis, editing or presentation may be performed. Specific examples of applications in which embodiments may be implemented include, but are not limited to, Adobe® Photoshop® and Adobe® Illustrator®. In addition to generating an estimate of sensor sensitivity, module 300 may be used to display, manipulate, modify, classify, and/or store the image, for example to a memory medium such as a storage device or storage medium.

Overview

Embodiments of the techniques disclosed herein may provide for the estimation of light sensor sensitivity from a single image, based on the insight that the sensor sensitivity, e.g., the ISO value, can be reconstructed with relatively little error, allowing for accurate scene brightness estimation for photographs where sensor sensitivity information was not stored based on images for which the sensitivity is available. More specifically, since increasing sensor sensitivity also amplifies the noise in a photograph, noise in a photograph (i.e. variations in pixel intensity not caused by corresponding variations in the scene) can be used to deduce the amount of amplification applied to the image. To estimate the missing sensitivity value of an image, the method takes advantage of the fact that there is a strong correlation between the sensitivity (e.g., ISO setting) of an image sensor and the noise the sensor records—the higher the sensitivity, the more noise is recorded. This relationship allows the determination of an approximate or estimated sensitivity (e.g., ISO value) from the amount of noise in an image.

Additionally, in some embodiments, this estimated sensor sensitivity may be used in combination with other parameters, e.g., image metadata, such as aperture (f) information, exposure time (t) information, and pixel intensity (I) information, to determine an estimate of scene brightness for the image, which may be useful in numerous applications.

For example, in one exemplary application, the estimate of scene brightness may be used (possibly in combination with other image attributes) to classify the image. More specifically, the estimate of scene brightness may be used for scene classification. Scene classification is the process of determining the category of the environment (e.g. mall, street, beach, park, forest, ocean, etc.) in which a photograph is taken. In image acquisition and image processing, understanding where a photograph is taken allows for more accurate reconstruction of the color, tone-mapping, etc. of the image. Moreover, as part of a broader goal, scene category (classification) information may be used in further applications, e.g., to improve the quality of photograph annotation and to allow for content based semantic image search, among others.

Figure 4:
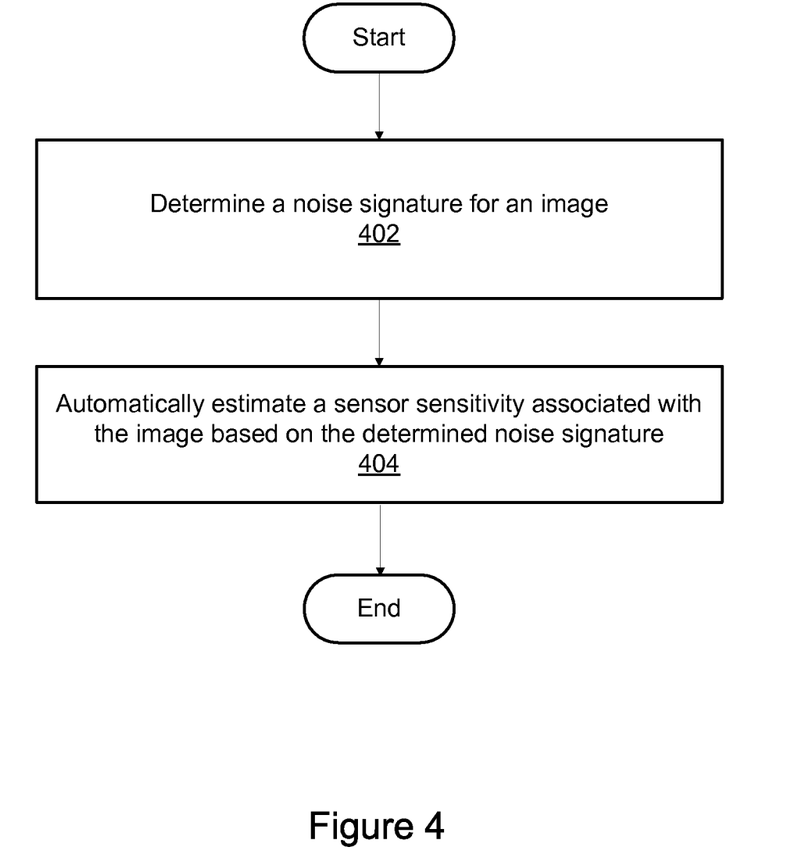
FIG. 4 is a flowchart illustrating a method for estimating sensor sensitivity from a single image, according to one embodiment.

FIG. 4—Method for Estimating Light Sensor Sensitivity Based on an Image

FIG. 4 is a flowchart illustrating a method for estimation of light sensor sensitivity based on a single image. The method shown in FIG. 4 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 402, a noise signature of an image may be determined. In other words, the image (i.e., image data) may be analyzed to determine the degree of noise in the image, and a signature or metric characterizing the degree of noise determined for the image. Note that there are numerous ways in which the noise signature may be determined. One particular approach to determining the noise signature is discussed below with respect to FIG. 5.

In 404, an estimate of sensor sensitivity associated with the image may be automatically determined based on the determined noise signature. For example, the noise signature may be provided as in input to a trained classifier, e.g., a support vector machine, neural network, etc., which may then operate to estimate the sensor sensitivity.

The estimate of the sensor sensitivity may then be stored, e.g. in a memory medium, and/or output to a display device or an external device, e.g. over a network. As will be discussed below, the sensor sensitivity estimate may be used to perform further analysis of the image. A more detailed embodiment of the method of FIG. 4 is described below with reference to FIG. 5.

Figure 5:
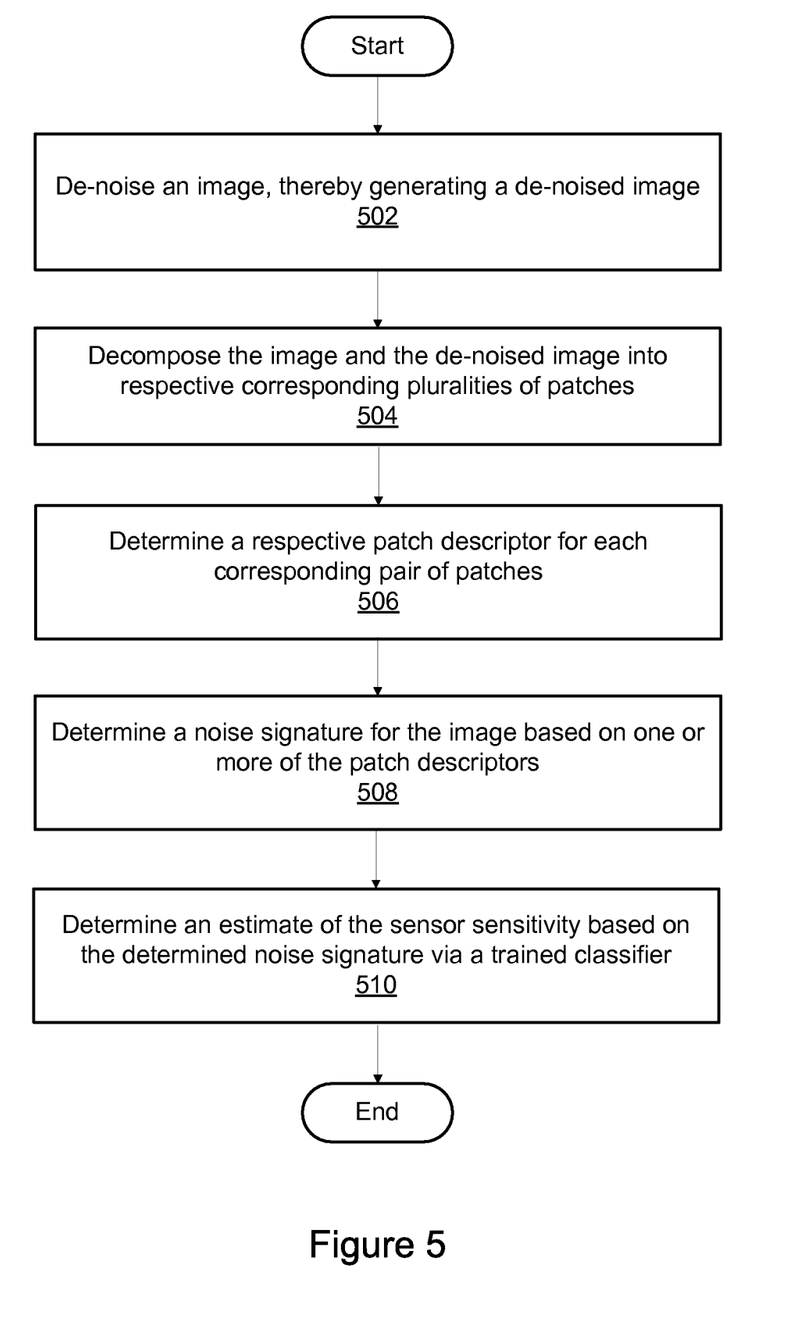
FIG. 5 is a flowchart illustrating another embodiment of a method for estimating sensor sensitivity from a single image.

FIG. 5—Another Method for Estimating Light Sensor Sensitivity Based on an Image

FIG. 5 is a flowchart illustrating a more detailed embodiment of the method of FIG. 4. The method shown in FIG. 5 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 502, an image may be de-noised, thereby generating a de-noised image. In other words, a digital signal recorded from a camera's image sensor is assumed to be corrupted by noise, thus deviating from a hypothetical ideal (noiseless) image. To approximate this ideal image, small deviations in the input signal may be removed or eliminated via an appropriate filter. Any of various filters can be used, including, but not limited to, Gaussian, Median, and Bilateral filters, among others. Thus, the original image is assumed to be noisy, and the de-noised image is assumed to be (substantially) noiseless. However, it should be noted that this is but one exemplary way to produce the de-noised image. More generally, the idea of de-noising the image is to produce an ideal (or an approximation of an) image free of noise, i.e., a substantially noise-free image, which may be accomplished via any of a variety of ways, e.g., via a generative model. In other words, the de-noised image may be produced independently of the original image. Note, however, that for simplicity and clarity, the term "de-noised image" is used herein to refer to such a substantially noise-free image, regardless of the manner in which it was obtained or generated.

Figure 6:
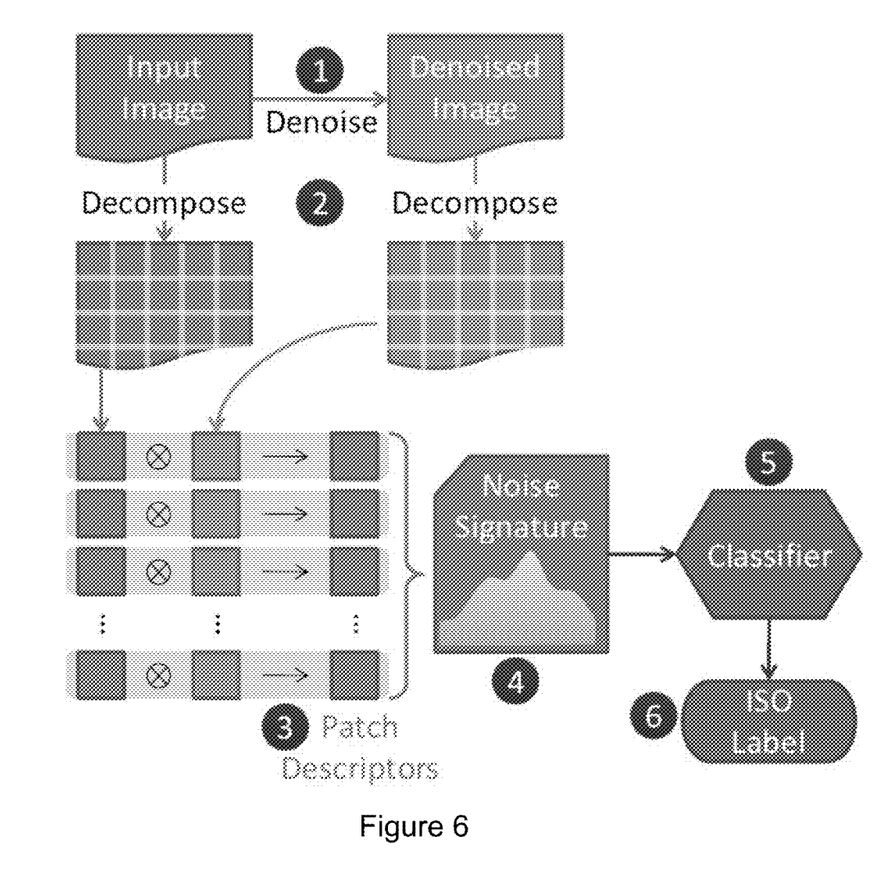
FIG. 6 illustrates an exemplary process flow diagram illustrating one embodiment of the method of FIG. 5.

FIG. 6 is an exemplary process flow diagram illustrating various elements corresponding to the method elements and features of the method of FIG. 5. As may be seen, item 1 (so labeled) in FIG. 6 illustrates the above-described de-noising of the original input image to generate the de-noised image.

In 504, both the original image and the de-noised image may be decomposed into respective and corresponding pluralities of patches. In other words, each image may be decomposed into a respective plurality of pixel patches, where each patch from the original image has a corresponding patch from the de-noised image, thus forming corresponding pairs of patches. In one embodiment, patches of various sizes may be generated, e.g., square patches of sizes 4×4, 8×8, and 16×16 pixels, and so each image may be partitioned or decomposed multiple times—once per patch size. Said another way, decomposing each of the image and the de-noised image into respective and corresponding pluralities of patches may include partitioning each image multiple times with respective different patch sizes. Computing patches at several different rectangle sizes enables the method to obtain cumulative information at multiple resolutions. In some embodiments, neighboring patches may overlap, e.g., by half the patch width, and so each portion of the image may be represented in more than one patch of a given size, and may also be represented in multiple patches of different size. Note that the spatial arrangement of patches is irrelevant to the present method, and so all patches (of all sizes) may be treated as a single long list of patches. Note further that generally, decomposing the image(s) may a produce a large number of patches, e.g., on the order of 800,000 patches for typical digital images of 2-5 Megapixels, although with smaller or larger images, and different sized patches, different numbers of patches may be produced. The decomposition of the images is illustrated by item 2 in FIG. 6.

In 506, a descriptor may be determined for each patch in the image based on the patch of the image and the corresponding patch of the de-noised image, where the descriptor characterizes noise in the patch of the image by summarizing the patch's pixel intensity and pixel alteration due to de-noising. In one embodiment, a descriptor (for each patch) may be determined for each of a plurality of image attributes. For example, in some embodiments, a separate descriptor may be determined per color channel of the image, e.g., for each of R (Red), G (Green), and B (Blue) color channels of the image, although it should be noted that other color models may be used as desired, e.g., CMYK (Cyan, Magenta, Yellow, Black), HSV (Hue, Saturation, and Value), and/or HSL (Hue, Saturation, and Lightness (or Luminance)), among others.

Moreover, in some embodiments, texture may also be included as a characterizing feature of the images, e.g., of the image patches. As used herein, "texture" refers to random, stochastic, or uncorrelated high-frequency variations in an image, e.g., exemplified by images of snow, sand, grass, forests, etc. Note that sometimes such textures may be confused with noise, and so including texture information in the characterization of a patch may improve the quality of the patch descriptors.

Thus, in one embodiment, for every corresponding pair of patches $\{P_i, P_d\}$, where $P_i$ is a patch from the input image and $P_d$ is a patch from the de-noised image, a patch descriptor may be determined. In one embodiment, the patch descriptor may be of the form:

$$P(P_i, P_d) = (I(P_i), n(P_i, P_d)) \quad (1)$$

where $I(P_i) = [0, 1]$ is the intensity of patch, computed as the mean pixel intensity of the patch from the original image, $I(P_i) = P_i$, and where $n(P_i, P_d)$ is the pixel alteration due to the de-noise process of 502 in each patch and in some embodiments may be defined as the average pixel difference (e.g., in R, G, B channels) between the original and the de-noised patch:

$$n(P_i, P_d) = \frac{1}{N} \sum_{j=1}^{N} \| P_{i_j} - P_{d_j} \|. \quad (2)$$

Note, however, that the average difference is just one metric that can be used to assign a value to the noise-difference between the noisy and de-noised image. Other distance metrics may be used that bias the result to maximum or minimum deviations. Additionally, the value need not necessarily be normalized by division by N. Thus, the expression of equation (2) is just one embodiment of a way to establish a difference value for the corresponding noisy and de-noised image patch. For simplicity, the "average difference" approach is used in the remainder of this document, although it should be noted that is but one exemplary or optional approach, and that any other measures may be used as desired.

In embodiments where each patch descriptor is based on pixel intensity and texture per color channel, the patch descriptor may be in the form:

$$P(P_i, P_d) = \{I(P_i), n(P_i, P_d), t(p_i, p_d)\}_c \quad (3)$$

where $t(p_i, p_d)$ is a texture classifier. The texture classifier t may include a small class of textures that occur frequently and occupy a significant area of a photograph, e.g., skin, sand, leaves, sky, snow, etc. c denote a color channel, where in some embodiments, c={Red, Green, Blue}, i.e., c may iterate over the each of the RGB color channels in an image. As noted above, in other embodiments, other color channels (models) may be used as desired. $I(P_i) = [0, 1]$ is the average intensity of R, G, or B pixels in the patch specified by c. $n(P_i, P_d)$ is defined similarly to equation (2), but for pixels specifically belonging to color channel c.

Thus, a plurality of patch descriptors may be determined that characterize differences between corresponding patches of the original image and the de-noised image, and thus that characterize noise in the patches of the (original) image. The generation of the patch descriptors of 506 is illustrated by item 3 of FIG. 6, where the symbol ⊗ represents a generic operator that takes as input corresponding patches from the noisy and de-noised image and produces a (possibly vector) descriptor of the noise in that patch which includes, but is not limited to, the average difference of pixels in the noisy and de-noised image. Additional entries in such a descriptor (e.g., vector) may include a texture descriptor that characterizes or classifies texture of the patch, amongst other metrics.

In 508, a noise signature for the image may be created based on the plurality of patch descriptors. There are numerous ways the noise signature may be built. For example, in one embodiment, a subset of the patches, or more accurately, patch descriptors, may be selected and used to build a noise signature for the image. The noise signature is illustrated by item 4 in FIG. 6.

High frequency changes in neighboring pixel values commonly arise from two sources: high frequency texture or noise in the digital image. Noise may be assumed to be present in all patches to varying degrees, but virtually every photograph contains at least some areas (hence some patches) where the image is smooth and free of high frequency texture. In one embodiment, patches with high frequency texture may be discarded (or not considered). The remaining patches may be assumed to be free of high frequency texture, and thus it may also be assumed that their high frequency pixel alteration values arise from noise only. In other words, descriptors of patches with high frequency texture may be discarded, thereby leaving a subset of the patches with little or no high frequency texture, where the noise signature may be created based on the subset of the patches.

In an alternative embodiment, the patch may be classified as having a texture of a certain characteristic (e.g., expressed as a texture class, such as "sand", "waves", "leaves", or, more generally, as a parametric descriptor, based on, e.g. a power-spectrum). Using this second approach, the textured patches are not discarded, but instead used to create a higher-dimensional noise signature (one that includes texture as a dimension). Thus, for example, a noise signature $S=\{S(I, t, c)\}_{I,t,c}$ (where t refers to texture class) may record or represent the amount of noise in the image for pixels corresponding to different levels of intensity, to different texture types, and for each color channel. Each entry in the noise signature, $S(I, t, c)$, may denote the estimated amount of noise for pixels with intensity I, texture t, and in color channel c. The patch intensity may be converted from a continuous variable into a discrete variable by binning it into K levels (bins). K should be sufficiently large to ensure enough resolution, although large K incurs additional computational cost without significant gain in the quality of the noise signature. In one embodiment, K=20 levels, although in other embodiments, K may be set to any other value desired.

The patches (or patch descriptors) may then be divided or sorted by their intensity level, color channel, and/or texture. Each patch descriptor may be assigned to a bin with corresponding intensity level, color channel, and/or texture. Within each bin, the patches may be sorted based on the amount of pixel alteration, and the descriptors with the lowest noise values selected. For example, in one embodiment, multiple groups of various sizes of the lowest noise descriptors may be selected to avoid being influenced unduly by misleading statistical deviations in the image data. For example, in one exemplary embodiment, the 25, 40, and 80 lowest noise valued descriptors may be selected, although in other embodiments, other numbers of groups (including one) and thresholds may be used as desired. Note that the amount of pixel alteration may indicate the amount of noise in the corresponding patch. The noise signature $S(I, t, c)$ may be defined as the weighted average pixel alteration of these 25, 40, and 80 patches, where patches with less noise are given greater weight. Any of a number of different approaches may be taken in weighting the patches (or descriptors), the point being to capture the minimum pixel alteration in each of the (I, t, c) bins.

Thus, in some embodiments, the noise signature may comprise a set of discrete noise values or descriptors correlated to one or more image attributes or parameters, e.g., intensity level, color channel, and/or texture, and thus may be or include a (possibly multi-dimensional) noise profile with respect to these parameters.

Finally, in 510, a trained classifier, denoted by item 5 of FIG. 6, may take the noise signature as input, e.g., as input features, and may generate a corresponding sensor sensitivity value, where the sensor sensitivity value is a "prediction" or estimate of the sensor sensitivity of the camera that produced the image. In one embodiment, the sensor sensitivity value may take the form of an ISO sensitivity value, e.g., in accordance with ISO 12232:2006, denoted by item 6 in FIG. 6, although any other representation of sensor sensitivity may be used as desired. As noted above, the classifier may be implemented in any of various ways, e.g., as a support vector machine (SVM), a neural network, etc., as desired. As also noted above, the predicted or estimated sensor sensitivity value may be stored, e.g. in a memory medium, and/or output to a display device or an external device, e.g. over a network. As also mentioned above, the sensor sensitivity estimate may be used to perform further analysis of the image, as described below.

Note that the trained classifier must have been trained at some point prior to the above generation of the sensor sensitivity value. In one embodiment, the training may include determining noise signatures as described above for each of a plurality of photographs for which sensor sensitivity is known, and providing these noise signatures and the corresponding sensor sensitivity values (e.g., ISO values) to the classifier as training input, e.g., as input labels, and the classifier trained accordingly. In one embodiment, a classifier may be built for each camera model (and possibly camera make) using a collection of photographs (e.g., random photographs taken with the same camera and retrieved from a photographic archive). In other words, the classifier may include a plurality of classifiers, each directed to a respective camera model or make.

When the sensitivity (e.g., ISO) value of an image is missing, the classifier may then predict the image's sensitivity (e.g., ISO) value based on its noise signature, as described above. Note that for camera models whose sensitivity (e.g., ISO) value is encoded in a proprietary format, experiments may be manually conducted and test images acquired in order to generate a collection of example photographs to train the classifier(s). A generic classifier may then be built (trained) for multiple camera models by including photographs from similar models from the same camera maker.

Thus, various embodiments of the above methods may be used to estimate sensor sensitivity associated with an image, e.g., to generate an estimate of sensor sensitivity (e.g., ISO value) of the camera that produced the image.

Determination of Scene Brightness

Note that sensor sensitivity (S) does not affect how much light enters a camera. Rather, the amount of light that reaches the sensor $Q=Bt/f^2$ is completely determined by scene brightness (B), aperture (f) and exposure time (t). Given identical scene and camera setup, a photograph taken at ISO 100 is generated from the same amount of light as a photograph taken at ISO 200. The only difference is that pixel intensity in the latter image is amplified by a factor of two. As noted above, increasing sensor sensitivity also amplifies the noise in the photograph, and so noise in a photograph (i.e. variations in pixel intensity not caused by corresponding variations in the scene) can be used to deduce the amount of amplification applied to the image, as discussed above in detail.

In the absence of sensor sensitivity information, embodiments of the present method may first estimate the amount of light (Q') captured by the camera sensor based on pixel intensity (I) information alone, then scene brightness (B') may be computed based on aperture (f) and exposure time (t) information.

The conventional scene brightness calculation can be described the following where Q is a function of I and S:

$$B=(f^2/t)\cdot Q(I,S) \qquad (4)$$

Embodiments of the present approach may compute scene brightness based on estimated Q', as a function of I only:

$$B'=(f^2/t)\cdot Q'(I) \qquad (5)$$

The following factors therefore influence the digital photographic exposure of a scene, i.e. the brightness of image pixels as a consequence of environmental factors and camera parameters:

1. Overall scene brightness—the light bouncing off all objects in the scene and entering the camera;
2. Aperture size—area through which light can stream to reach the image sensor;
3. Image sensor size—the area across which light photons are detected;
4. Exposure Time—the duration in which light can stream through the aperture; and
5. Sensor sensitivity—determines the probability that sensor events are triggered by photons instead of random thermal events, i.e. noise—higher sensitivity results in higher noise.

In the description below, the following symbols may be used to represent the above measures:

(L)—luminance; (B)—scene brightness; (f)—aperture (quotient of aperture area and image sensor area); (t)—exposure time; (S)—sensor sensitivity; (I)—intensity of pixels in the final digital photograph.

Scene Brightness Calculation Based on f, t, S, I

Strictly speaking, the brightness of a scene refers to the average scene luminance (L) in physical units of lux (light energy per second per unit area). For photographic purposes, it is not necessary to know the absolute physical luminance. Photographers are generally more interested in knowing how much brighter or darker a scene is relative to another (i.e. standard) scene. The definition of a standard scene differs slightly between camera makers. A standard scene, as defined by Canon and Nikon, is one lit by 0.0125 lux of light, although it should be noted that other "standard" values may be used as desired.

Scene brightness (B) in photography, therefore, is a dimensionless quantity and expresses scene luminance (L) relative to a reference luminance ($L_o$):

$$B = L/L_0. \quad (6)$$

Exposure step (EV) expresses scene brightness on a logarithmic scale. In photography literature, a change in brightness by a factor two is frequently referred to as a change of 1 exposure step:

$$EV = \log_2(B) \quad (7)$$

To determine scene brightness from pixel intensity (I) in a photographic image, camera parameters that affect how a digital still camera responds to light must be taken into account.

The part of the ISO 12232:2006 standard relevant to the present method specifies that in a scene lit by standard luminance $L_0$, photographing a grey card that reflects 18% of incident light with an aperture of f/1 ($f_0 = 1.0$) with an exposure time of 1 second ($t_0 = 1.0$) and with a sensor sensitivity of ISO 100 ($S_0 = 100$) should produce pixels that are 18% saturated ($I_0 = 0.18$) in the final photographic image.

Scene brightness (B) and the pixel intensity (I) are, therefore, correlated through aperture (f), exposure time (t), and sensor sensitivity (S). The relationship is given by the following equation.

$$B \cdot (f_0/f)^2 \cdot (t/t_0) = (S_0/S) \cdot (I/I_0)$$

$$B \cdot t/f^2 = Q = 556 \cdot I/S \quad (8)$$

The left hand side of equation (8), $Bt/f^2$, describes the amount of light (Q) that enters the camera and is captured by the sensor. The right hand side of equation (8), 556I/S, determines how light energy (Q) is converted to pixel intensity in the final photographic image.

Aperture (f) is the opening in a lens that allows light to pass through. A photographer can limit the amount of light entering a camera by reducing the size of the aperture. This size is expressed in f numbers where "an f number of 2.8" is written as "f/2.8". The radius of an aperture f/2 is half that of an aperture f/1. Consequently, an aperture f/2 has an opening that is a quarter in area and lets in one fourth as much light as an aperture f/1.

Exposure time (t) describes the duration for which the shutter is opened. A photographer can increase or decrease the amount of light arriving at the sensor by exposing a photograph for longer or shorter periods of time. The relationship is linear—exposing for twice as long lets in twice as much light.

Pixel intensity (I) in a photograph is linearly proportional to the amount of light captured by the sensor.

The rate of conversion from light energy to pixel intensity is given by sensor sensitivity (S) which is expressed in ISO speed ratings. When exposed to the same amount of light, a sensor set at ISO 200 produces pixels that have twice the intensity as a sensor set at ISO 100.

In other words, given the intensity of pixels in a photograph corresponding to an object that reflects 18% of incident light, and knowing the aperture, exposure time, and sensor sensitivity used to compose the photograph, we can compute the brightness of the original scene:

$$B = (f^2/t) \cdot (556 \cdot I/S) \quad (9)$$

Figure 7:
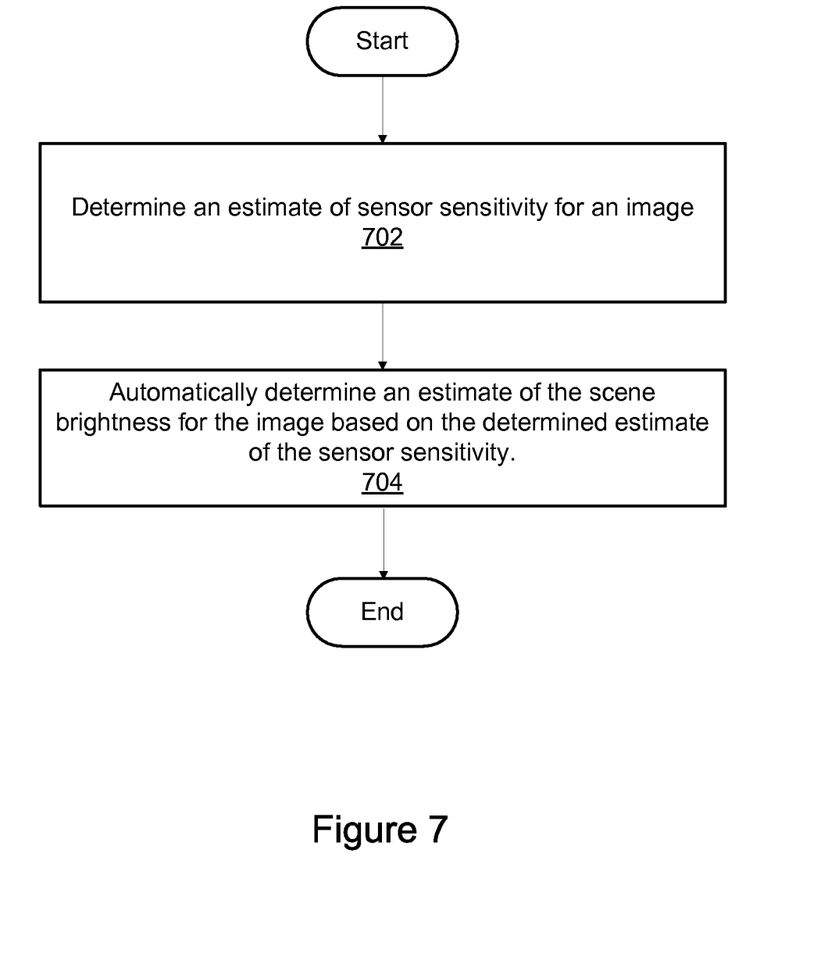
FIG. 7 is a flowchart of a method for determining scene brightness based on an estimate of sensor sensitivity associated with the image, according to one embodiment.

FIG. 7—Method for Estimating Scene Brightness Based on an Estimate of Image Sensor Sensitivity FIG. 7 is a flowchart of a method for determining scene brightness based on an estimate of sensor sensitivity associated with the image. The method shown in FIG. 7 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 702, a sensor sensitivity associated with an image may be estimated. In other words, an estimate of sensor sensitivity associated with an image may be determined, e.g., in accordance with an embodiment of the methods described above.

In 704, an estimate of scene brightness for the image may be automatically determined based on the estimate of sensor sensitivity and metadata of the image, where the metadata includes aperture information, exposure time information, and intensity information (for the image), e.g., via equation (9), derived above. The estimate for scene brightness may then be stored in a memory medium, or output to an external device, e.g., a monitor, printer, or other computer system, e.g., over a network.

As noted above, the estimate of scene brightness for the image may be used, e.g., in conjunction with other aspects of the image, in any of numerous applications, one example of which is to categorize or classify the image (or scene), e.g., for subsequent use by search engines, e.g., for search and retrieval of images based on semantic content of the image(s), among other applications. For example, images may be categorized according to scenario, e.g., beach, mountain, sea, mall, etc., where a particular image may be identified as representing a particular category, e.g., of ~20 categories.

Thus, in some embodiments, the method may further include categorizing the image based on the estimate of scene brightness, thereby generating a category for the image, where, as mentioned above, the category for the image may be useable to perform semantic based image operations. For example, suitable keywords or tags representing the identified category may be determined or suggested, where the keywords or tags may be useable to perform search, retrieval, and matching operations with respect to the image, e.g., where search tools can then locate the image based on the keywords or tags.

Exemplary Preliminary Results

Applying the above techniques using photographs taken with Nikon D80 cameras by different users, an average prediction error of 1.0 EV has been achieved. However, it should be noted that these results are preliminary and can be improved with further refinement to the classification process (which used an SVM with a linear separator), a better or more detailed noise signature.

Consumer digital cameras currently available can operate under varying lighting conditions, e.g., from dark environments lit by candle light to bright environments under direct sunlight, where the brightness can vary by factors of over 1,000,000 (i.e. over 20 exposure steps). The three camera parameters (f, t, S) used in conjunction may allow a photographer to adapt to different lighting conditions:

Aperture: By closing down (f/28) and opening up the aperture (f/1), a photographer can adjust the rate at which light enters the camera by a factor up to 784 (a change of 9.6 EV).

Exposure time: By exposing for shorter (1 ms) or longer period of time (30 s), a photographer can adapt to light conditions that differ by a factor of over 30,000 (a change of 14.9 EV).

Sensor sensitivity: The latest digital cameras can adjust the sensor sensitivity by a factor up to 256 (a change of 8.0 EV).

Note that without sensor sensitivity information, there can be significant error in calculating scene brightness. Thus, embodiments of the above method(s) may facilitate estimation of scene brightness with an average error of 1.0 exposure step or better.

Exemplary Applications

One direct application of scene brightness is in predicting environmental scenes. "Indoors vs outdoors" is often considered to be the top level category of environmental scenes, and the ability to predict it accurately can impact how well more specific environmental scenes can be predicted. Sensor brightness is currently one of the most reliable parameters for determining whether a photograph is taken indoors versus outdoors.

Some existing work uses the noise signature to synthesize noise uniformly across the image. The above-described extended noise signature that models texture may allow adaptive noise synthesis where different amounts of noise are generated for each region of an image based on its texture. Another potential application of the noise signature disclosed herein is regarding noise removal that treats different texture regions differently.

Embodiments of the above methods may be applied to digital scans of film images, e.g., of digitized images of "analog" or film-based photographs, e.g., film negatives, although additional analysis and/or processing may be required to take into account the effects of the scanning operation, as well as any peculiarities or idiosyncrasies of film-based photography.

Thus, various embodiments of the systems and methods disclosed herein may be used to estimate sensor sensitivity for an image, and may further facilitate estimation of scene brightness using the estimated sensor sensitivity and additional metadata associated with the image.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
de-noising an image to generate a de-noised image from the image;
determining a noise signature of the image, wherein said determining the noise signature is based on differences between the image and the de-noised image; and
automatically determining an estimate of sensor sensitivity associated with the image based on the determined noise signature, wherein the sensor sensitivity is of a sensor used to capture the image.

2. The computer-implemented method of claim 1, wherein said determining a noise signature of the image comprises:
de-noising the image, thereby generating a de-noised image;
decomposing each of the image and the de-noised image into respective and corresponding pluralities of patches;
determining at least one respective patch descriptor for each patch of the image based on the patch of the image and the corresponding patch of the de-noised image, wherein the patch descriptor characterizes noise in the patch of the image by summarizing differences between the patch of the image and the corresponding patch of the de-noised image; and
creating the noise signature for the image based on the patch descriptors.

3. The computer-implemented method of claim 2, wherein said decomposing each of the image and the de-noised image into respective and corresponding pluralities of patches comprises partitioning each image multiple times with respective different patch sizes.

4. The computer-implemented method of claim 2, wherein said determining at least one respective patch descriptor for each patch of the image comprises determining a patch descriptor for each patch per color channel.

5. The computer-implemented method of claim 2, wherein the respective patch descriptor further includes a texture descriptor that characterizes texture of the patch.

6. The computer-implemented method of claim 5, wherein said creating the noise signature for the image based on the patch descriptors comprises:
discarding descriptors of patches with high frequency texture, thereby leaving a subset of the patches with little or no high frequency texture; and
creating the noise signature based on the subset of the patches.

7. The computer-implemented method of claim 2, wherein said creating the noise signature for the image based on the patch descriptors comprises:
sorting the patch descriptors into bins based on intensity, color channel, and/or texture;
sorting the patch descriptors within each bin based on amount of pixel alteration;
selecting the patch descriptors with the lowest pixel alteration within each bin, wherein the amount of pixel alteration indicates the amount of noise in the corresponding patch; and
creating the noise signature based on a weighted average pixel alteration of the selected patch descriptors.

8. The computer-implemented method of claim 2, wherein said automatically determining an estimate of sensor sensitivity associated with the image based on the determined noise signature comprises:

provide the noise signature for the image to a trained classifier as input; and the trained classifier generating the estimate of sensor sensitivity based on the noise signature.

9. The computer-implemented method of claim 8, further comprising training the classifier prior to said trained classifier generating the estimate of sensor sensitivity, wherein said training the classifier comprises:

determining noise signatures for each of a plurality of photographs for which sensor sensitivity is known; and training the classifier using the determined noise signatures and corresponding sensor sensitivity values to the classifier as training input.

10. The computer-implemented method of claim 8, wherein the classifier comprises a plurality of classifiers, each directed to a respective camera model or make.

11. The computer-implemented method of claim 1, further comprising:

automatically determining an estimate of scene brightness based on the estimate of sensor sensitivity and metadata of the image, wherein the metadata comprises aperture information, exposure time information, and intensity information for the image; and storing the estimate of scene brightness, wherein the estimate of scene brightness is useable to categorize the image.

12. The computer-implemented method of claim 11, further comprising:

categorizing the image based on the estimate of scene brightness, thereby determining a category for the image, wherein the category for the image is useable to perform semantic based image operations.

13. The computer-implemented method of claim 12, further comprising:

determining one or more keywords or tags for the image based on the determined category, wherein the one or more keywords or tags are useable to perform search, retrieval, and matching operations with respect to the image.

14. A non-transitory computer-readable storage medium that stores program instructions computer-executable to implement:

de-noising an image to generate a de-noised image from the image;

determining a noise signature of the image, wherein said determining the noise signature is based on differences between the image and the de-noised image; and automatically determining an estimate of sensor sensitivity associated with the image based on the determined noise signature, wherein the sensor sensitivity is of a sensor used to capture the image.

15. The non-transitory computer-readable storage medium of claim 14, wherein said determining a noise signature of the image comprises:

de-noising the image, thereby generating a de-noised image;

decomposing each of the image and the de-noised image into respective and corresponding pluralities of patches;

determining at least one respective patch descriptor for each patch of the image based on the patch of the image and the corresponding patch of the de-noised image, wherein the patch descriptor characterizes noise in the patch of the image by summarizing differences between the patch of the image and the corresponding patch of the de-noised image; and creating the noise signature for the image based on the patch descriptors.

16. The non-transitory computer-readable storage medium of claim 15, wherein said decomposing each of the image and the de-noised image into respective and corresponding pluralities of patches comprises partitioning each image multiple times with respective different patch sizes.

17. The non-transitory computer-readable storage medium of claim 15, wherein said determining at least one respective patch descriptor for each patch of the image comprises determining a patch descriptor for each patch per color channel.

18. The non-transitory computer-readable storage medium of claim 15, wherein the respective patch descriptor further includes a texture descriptor that characterizes texture of the patch.

19. The non-transitory computer-readable storage medium of claim 18, wherein said creating the noise signature for the image based on the patch descriptors comprises:

discarding descriptors of patches with high frequency texture, thereby leaving a subset of the patches with little or no texture; and creating the noise signature based on the subset of the patches.

20. The non-transitory computer-readable storage medium of claim 15, wherein said creating the noise signature for the image based on the patch descriptors comprises:

sorting the patch descriptors into bins based on intensity, color channel, and/or texture;

sorting the patch descriptors within each bin based on amount of pixel alteration;

selecting the patch descriptors with the lowest pixel alteration within each bin, wherein the amount of pixel alteration indicates the amount of noise in the corresponding patch; and creating the noise signature based on a weighted average pixel alteration of the selected patch descriptors.

21. The non-transitory computer-readable storage medium of claim 15, wherein said automatically determining an estimate of sensor sensitivity associated with the image based on the determined noise signature comprises:

providing the noise signature for the image to a trained classifier as input; and the trained classifier generating the estimate of sensor sensitivity based on the noise signature.

22. The non-transitory computer-readable storage medium of claim 21, wherein the program instructions are further computer-executable to train the classifier prior to said trained classifier generating the estimate of sensor sensitivity, wherein said training the classifier comprises:

determining noise signatures for each of a plurality of photographs for which sensor sensitivity is known; and training the classifier using the determined noise signatures and corresponding sensor sensitivity values to the classifier as training input.

23. The non-transitory computer-readable storage medium of claim 21, wherein the classifier comprises a plurality of classifiers, each directed to a respective camera model or make.

24. The non-transitory computer-readable storage medium of claim 14, wherein the program instructions are further computer-executable to implement:

automatically determining an estimate of scene brightness based on the estimate of sensor sensitivity and metadata of the image, wherein the metadata comprises aperture information, exposure time information, and intensity information for the image; and storing the estimate of scene brightness, wherein the estimate of scene brightness is useable to categorize the image.

25. The non-transitory computer-readable storage medium of claim 24, wherein the program instructions are further computer-executable to implement:

categorizing the image based on the estimate of scene brightness, thereby determining a category for the image, wherein the category for the image is useable to perform semantic based image operations.

26. The non-transitory computer-readable storage medium of claim 25, wherein the program instructions are further computer-executable to implement:

determining one or more keywords or tags for the image based on the determined category, wherein the one or more keywords or tags are useable to perform search, retrieval, and matching operations with respect to the image.

27. A system, comprising:

at least one processor; and a memory coupled to the at least one processor, wherein the memory stores program instructions, wherein the program instructions are executable by the at least one processor to:

de-noise an image to generate a de-noised image from the image;

determine a noise signature of the image, wherein said determining the noise signature is based on differences between the image and the de-noised image; and automatically determine an estimate of sensor sensitivity associated with the image based on the determined noise signature, wherein the sensor sensitivity is of a sensor used to capture the image.

28. The system of claim 27, wherein to determining a noise signature of the image, the program instructions are computer-executable to:

de-noise the image, thereby generating a de-noised image;

decompose each of the image and the de-noised image into respective and corresponding pluralities of patches;

determine at least one respective patch descriptor for each patch of the image based on the patch of the image and the corresponding patch of the de-noised image, wherein the patch descriptor characterizes noise in the patch of the image by summarizing differences between the patch of the image and the corresponding patch of the de-noised image; and create the noise signature for the image based on the patch descriptors.

29. The system of claim 28, wherein said decomposing each of the image and the de-noised image into respective and corresponding pluralities of patches comprises partitioning each image multiple times with respective different patch sizes.

30. The system of claim 28, wherein to determine at least one respective patch descriptor for each patch of the image, the program instructions are computer-executable to determine a patch descriptor for each patch per color channel.

31. The system of claim 28, wherein the respective patch descriptor further includes a texture descriptor that characterizes texture of the patch.

32. The system of claim 31, wherein to create the noise signature for the image based on the patch descriptors, the program instructions are computer-executable to:

discard descriptors of patches with high frequency texture, thereby leaving a subset of the patches with little or no texture; and create the noise signature based on the subset of the patches.

33. The system of claim 28, wherein to create the noise signature for the image based on the patch descriptors, the program instructions are computer-executable to:

sort the patch descriptors into bins based on intensity, color channel, and/or texture;

sort the patch descriptors within each bin based on amount of pixel alteration;

select the patch descriptors with the lowest pixel alteration within each bin, wherein the amount of pixel alteration indicates the amount of noise in the corresponding patch; and create the noise signature based on a weighted average pixel alteration of the selected patch descriptors.

34. The system of claim 28, wherein to automatically determine an estimate of sensor sensitivity associated with the image based on the determined noise signature, the program instructions are computer-executable to:

provide the noise signature for the image to a trained classifier as input, wherein the trained classifier generates the estimate of sensor sensitivity based on the noise signature.

35. The system of claim 34, wherein the program instructions are further executable to train the classifier prior to said trained classifier generating the estimate of sensor sensitivity, wherein to train the classifier the program instructions are computer-executable to:

determine noise signatures for each of a plurality of photographs for which sensor sensitivity is known; and train the classifier using the determined noise signatures and corresponding sensor sensitivity values to the classifier as training input.

36. The system of claim 34, wherein the classifier comprises a plurality of classifiers, each directed to a respective camera model or make.

37. The system of claim 27, wherein the program instructions are further executable to:

automatically determine an estimate of scene brightness based on the estimate of sensor sensitivity and metadata of the image, wherein the metadata comprises aperture information, exposure time information, and intensity information for the image; and store the estimate of scene brightness, wherein the estimate of scene brightness is useable to categorize the image.

38. The computer-readable storage medium of claim 37, wherein the program instructions are further executable to:

categorize the image based on the estimate of scene brightness, thereby determining a category for the image, wherein the category for the image is useable to perform semantic based image operations.

39. The computer-readable storage medium of claim 38, wherein the program instructions are further executable to:

determine one or more keywords or tags for the image based on the determined category, wherein the one or more keywords or tags are useable to perform search, retrieval, and matching operations with respect to the image.

40. A computer-implemented method, comprising:

executing instructions on a computing platform, the instructions for de-noising an image so that a de-noised image is generated from the image;

executing instructions on a computing platform so that binary digital electronic signals representing a noise signature of the image are determined, wherein said determined noise signature is based on differences between the image and the de-noised image;

executing instructions on the computing platform so that binary digital electronic signals representing an estimate of sensor sensitivity associated with the image are determined based on the noise signature, wherein the sensor sensitivity is of a sensor used to capture the image; and storing an indication of the determined estimate of sensor sensitivity.

* * * * *